US006445097B1

(12) United States Patent
Zeiler et al.

(10) Patent No.: US 6,445,097 B1
(45) Date of Patent: Sep. 3, 2002

(54) METHOD FOR ASSEMBLING AND ELECTRICAL CONNECTOR ASSEMBLY FOR A POWER TOOL

(75) Inventors: Jeffrey M. Zeiler, Delafield; Jeffrey C. Hessenberger, Neosho, both of WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 09/452,479

(22) Filed: Dec. 1, 1999

(51) Int. Cl.[7] ............................................. H02K 15/00
(52) U.S. Cl. ............................ 310/71; 310/47; 310/42
(58) Field of Search ............................... 310/47, 71, 42

(56) References Cited

U.S. PATENT DOCUMENTS

| 1,849,263 A | 3/1932 | Apple |
| 1,858,870 A | 5/1932 | Apple |
| 2,045,218 A | 6/1936 | Desoutter |
| 2,243,063 A | 5/1941 | Arey |
| 2,534,951 A | 12/1950 | Cargill |
| 2,957,056 A | 10/1960 | Gute |
| 3,170,048 A | 2/1965 | Glatz et al. |

(List continued on next page.)

FOREIGN PATENT DOCUMENTS

| AU | B-24590 84 | 10/1984 |
| CA | 1221398 | 5/1987 |
| CH | 608 918 | 1/1979 |
| DE | 31 23 517 C2 | 3/1983 |
| DE | 34 04 974 C2 | 10/1984 |
| EP | 0 224 053 | 6/1987 |
| EP | 0 235 443 A1 | 9/1987 |
| EP | 0 235 735 A1 | 9/1987 |
| FR | 648 055 | 12/1928 |
| FR | 2 543 751 A1 | 10/1984 |
| GB | 1 586 227 | 3/1981 |
| GB | 1 598 288 | 9/1981 |
| GB | 2 137 821 B | 10/1984 |
| GB | 2 166 008 B | 4/1986 |
| JP | 59-185142 | 10/1984 |
| JP | 6-189508 | 7/1994 |

*Primary Examiner*—Burton S. Mullins
(74) *Attorney, Agent, or Firm*—Michael Best & Friedrich LLP

(57) ABSTRACT

An electrical connector assembly for a power tool, a power tool and methods for assembling a power tool. A one-piece trace or spider terminal member assembly provides points of connection for the motor components, such as the field windings, the brushes and the switch. To assemble the motor, the terminal member assembly is positioned in the motor housing. To mount the terminal member assembly, the terminal member assembly is preferably co-molded with the housing or, alternatively, may snap-fit into connectors formed on the housing. The terminal member assembly and the housing are then preferably punched or stamped at points to provide the necessary number of electrically separated contact elements to connect the components of the motor. For example, the female ends or terminals of the field windings, the brushes and the switch are connected to the electrically separated contact elements to provide a suitable complete electrical circuit for the motor. Non-conducting members are positioned between adjacent ones of the electrically separated contact elements.

28 Claims, 5 Drawing Sheets

U.S. PATENT DOCUMENTS

| | | |
|---|---|---|
| 3,210,577 A | 10/1965 | Hogue |
| 3,225,230 A | 12/1965 | Maffey, Jr. |
| 3,248,582 A | 4/1966 | Brown |
| 3,440,465 A | 4/1969 | Pratt et al. |
| 3,456,743 A | 7/1969 | Badcock |
| 3,484,860 A | 12/1969 | Csaki |
| 3,603,824 A | 9/1971 | Csaki |
| 3,636,393 A | 1/1972 | Pieper |
| 3,699,366 A | 10/1972 | Wood |
| 3,780,323 A | 12/1973 | Swain |
| 3,984,712 A | 10/1976 | Hill |
| 4,038,574 A | 7/1977 | Crow et al. |
| 4,056,749 A | 11/1977 | Carlson, Jr. et al. |
| 4,090,098 A | 5/1978 | Kranzler et al. |
| 4,112,321 A | 9/1978 | Wan |
| 4,293,789 A | 10/1981 | King |
| 4,342,929 A | 8/1982 | Horne |
| 4,342,931 A | 8/1982 | Grossmann et al. |
| 4,348,603 A | 9/1982 | Huber |
| 4,370,579 A | 1/1983 | Kobayashi et al. |
| 4,414,481 A | 11/1983 | de Jong |
| 4,484,096 A | 11/1984 | Sauerwein et al. |
| 4,523,115 A | 6/1985 | Cuneo |
| 4,523,116 A | 6/1985 | Dibbern, Jr. et al. |
| 4,558,189 A | 12/1985 | Dubbern, Jr. et al. |
| 4,569,125 A | 2/1986 | Antl et al. |
| 4,574,471 A | 3/1986 | Dibbern, Jr. et al. |
| 4,581,499 A | 4/1986 | Cousins |
| 4,587,384 A | 5/1986 | Yacobi |
| 4,593,220 A | 6/1986 | Cousins et al. |
| 4,613,781 A | 9/1986 | Sanders |
| 4,616,149 A | 10/1986 | Best |
| 4,677,329 A | 6/1987 | Secoura |
| 4,684,774 A | 8/1987 | Dibbern, Jr. et al. |
| 4,748,353 A | 5/1988 | Klingenstein et al. |
| 4,782,261 A | 11/1988 | Crevling, Jr. et al. |
| 4,800,312 A | 1/1989 | Wacek et al. |
| 4,845,396 A * | 7/1989 | Huber ................. 310/239 |
| 4,851,729 A | 7/1989 | Baines |
| 4,851,730 A | 7/1989 | Fushiya et al. |
| 4,895,536 A | 1/1990 | Gingerich et al. |
| 4,926,075 A | 5/1990 | Fushiya et al. |
| 4,978,877 A | 12/1990 | Quirijnen |
| 5,006,765 A * | 4/1991 | Schmider ................. 310/71 |
| 5,015,896 A | 5/1991 | Wong |
| 5,089,729 A | 2/1992 | Moores, Jr. |
| 5,140,207 A * | 8/1992 | Baumeister et al. ......... 310/83 |
| 5,149,999 A | 9/1992 | Abo et al. |
| 5,184,041 A | 2/1993 | Baer et al. |
| 5,196,747 A * | 3/1993 | Kress et al. ................. 310/89 |
| 5,309,053 A * | 5/1994 | Ade ........................ 310/71 |
| 5,444,315 A * | 8/1995 | Adam et al. ................. 310/42 |
| 5,777,410 A * | 7/1998 | Asakura et al. ............. 310/71 |
| 5,821,663 A * | 10/1998 | Kiehnle et al. ............ 310/249 |

* cited by examiner

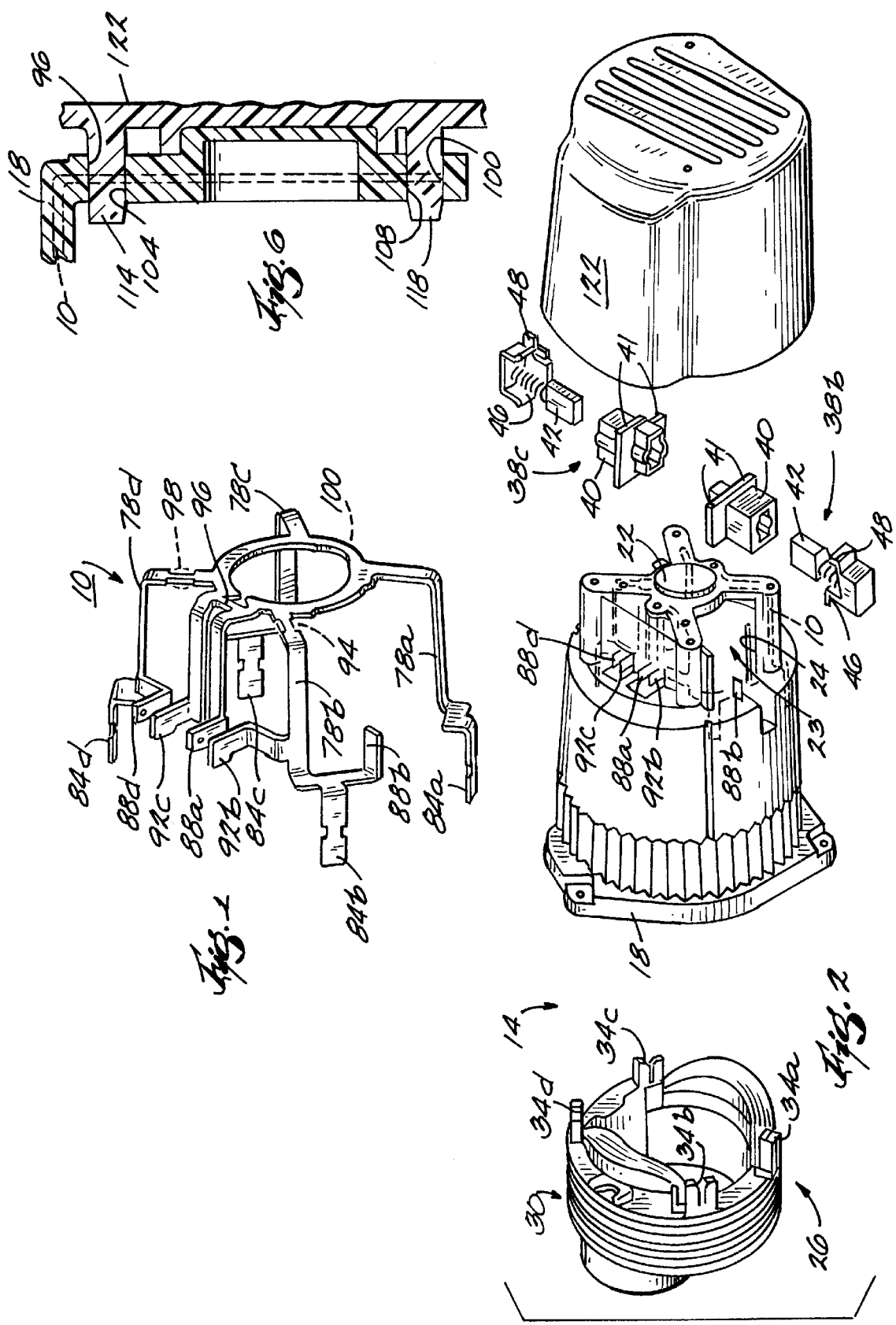

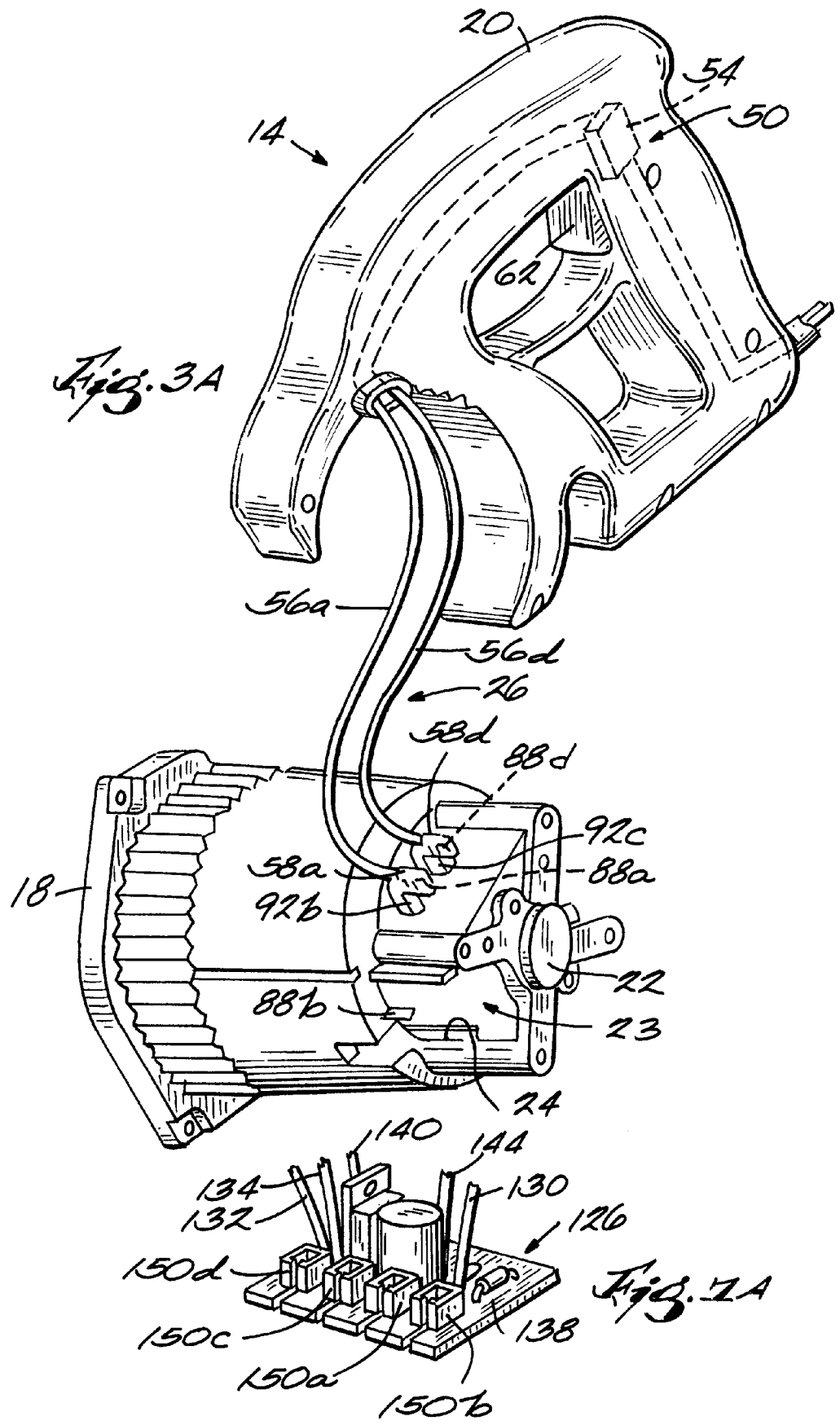

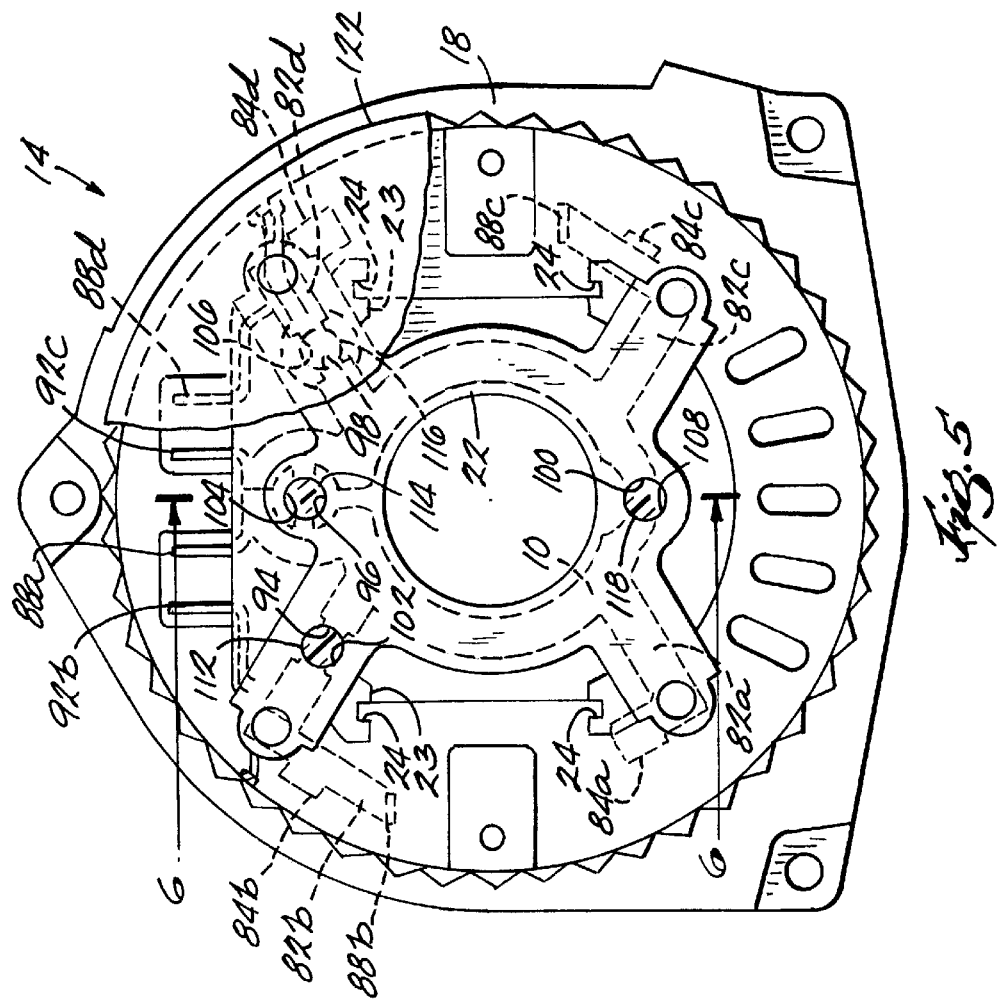
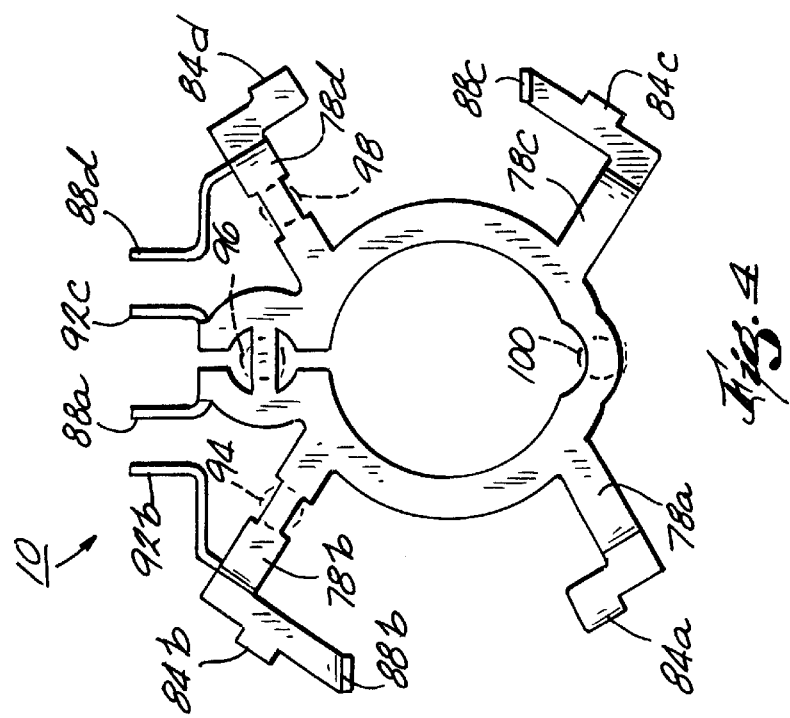
Fig. 5
Fig. 4

METHOD FOR ASSEMBLING AND ELECTRICAL CONNECTOR ASSEMBLY FOR A POWER TOOL

FIELD OF THE INVENTION

The invention relates to power tools and, more particularly, to a method for assembling and an electrical connector assembly for a power tool.

BACKGROUND OF THE INVENTION

A typical power tool includes a motor housing and an electric motor supportable by the motor housing and electrically connectable with a power source. The electric motor may include a field assembly, including one or more field windings, a rotatable armature supporting a commutator, a carbon brush for electrically engaging the commutator, and a switch for electrically connecting the components of the electric motor to the power source. In some power tools, the components of the electric motor are directly electrically wired to one another to provide a complete electrical circuit for the motor.

In some other power tools, the components of the electric motor include respective terminals and the motor also includes an electrical connection system electrically connecting the motor components. In such power tools, the electrical connection system includes separate contact strips which are separately mounted on the housing. Once mounted, the forward ends of the contact strips are engaged with the field terminals, and the rearward ends of the contact strips engage the brush terminals or the wiring harness for connection to the switch to provide a complete electrical circuit for the motor.

SUMMARY OF THE INVENTION

One problem with power tools having above-described directly-wired components is that direct wiring of the motor components during assembly of such power tools is time-consuming and labor-intensive, greatly increasing the cost and the complexity of the method and the machinery for assembling the power tools.

One problem with the power tool with the above-described electrical connection system including contact strips is that, while the contact strips improve the efficiency of assembly of the power tool, each of the separate contact strips must be accurately positioned and fixed to the housing so that the components of the motor can be electrically connected. If a contact strip is improperly positioned or improperly fixed to the housing, corrective action is required so that the motor components can be electrically connected to one another, reducing the efficiency of the assembly process.

Another problem with the power tool with the above-described electrical connection system is that the motor housing must be designed to fixably support and retain the contact strips in the required position. If the motor housing is improperly formed, the motor housing will not support the contact strips in the required location (for proper connection to the motor components) and, therefore, will not be useable.

Yet another problem with the above-described power tools is that, because the direct wires or the contact strips do not provide additional structural rigidity to the motor housing, the motor housing, which is typically formed of a moldable material, requires a greater amount of material and a more durable material, increasing the cost of the power tool.

Another problem with some of the above-described power tools is that the power tool cannot be configured to have different operating conditions, such as with or without a braking capability, without changing the wiring or the electrical connection system of the power tool.

The present invention provides a method for assembling and an electrical connector assembly for a power tool that alleviates the problems with the above-described power tools. In some aspects, the invention provides a one-piece trace or spider terminal member assembly which provides points of connection for the motor components, such as the field assembly, the brushes and the switch. To assemble the motor, the one-piece terminal member assembly is positioned in the motor housing. To mount the terminal member assembly, the terminal member assembly is preferably co-molded as a unit with the housing or, alternatively, may snap-fit into connectors formed on the housing. The terminal member assembly and the housing are then preferably punched or stamped at points to provide the necessary number of electrically separated contact elements to connect the components of the motor. For example, the female ends or terminals of the field assembly, the brushes and the switch are connected to the electrically separated contact elements to provide a suitable complete electrical circuit for the motor. A non-conducting plug may fill the openings created by punching or stamping. The plug also confirms that the openings were punched or stamped. Further, the plug provides a seal to prevent debris from entering the opening and effecting the electrical circuit of the motor. More particularly, the invention provides a method for assembling a power tool, the power tool including a motor housing, and a motor supportable by the housing, the method comprising the acts of providing a terminal member assembly including a plurality of electrically separable contact elements, mounting the terminal member in the motor housing, electrically separating the plurality of electrically separable contact elements of the terminal member assembly from one another to provide a corresponding plurality of electrically separated contact elements, supporting the motor in the motor housing, and electrically connecting the plurality of electrically separated contact elements to the motor to provide a complete electrical circuit for the motor.

Preferably, the housing is formed of a molded material and the act of mounting the terminal member assembly includes molding the terminal member assembly as a unit with the motor housing. Also, the act of separating preferably includes creating an opening in the terminal member assembly between adjacent ones of the plurality of electrically separable contact elements to provide the plurality of electrically separated contact elements.

In addition, the act of creating an opening may preferably include punching an opening in the terminal member assembly between adjacent ones of the plurality of electrically separable contact elements to provide the plurality of electrically separated contact elements. Preferably, the act of punching provides a corresponding hole in the motor housing substantially aligned with the opening between adjacent ones of the plurality of electrically separated contact elements.

The method may further preferably comprise the act of positioning a non-conducting element in the opening between adjacent ones of the plurality of electrically separated contact elements and, preferably, through the corresponding hole in the motor housing. Also, the method may further preferably comprise the act of providing a separate motor housing cover having the non-conducting element mounted thereon, positioning the separate motor housing cover over the motor housing, and positioning the non-conducting element in the opening between adjacent ones of the plurality of electrically separated contact elements.

The motor may include a field having a plurality of field terminals, and each of the plurality of electrically separated contact elements may have at least a first contact. Preferably, the act of supporting the motor includes supporting the field in the motor housing, and the act of electrically connecting the plurality of electrically separated contact elements to the motor includes electrically connecting the first contact of a corresponding one of the plurality of electrically separated contact elements with one of the plurality of field terminals. Preferably, the act of supporting the field occurs substantially simultaneously with the act of electrically connecting the first contact of the corresponding one of the plurality of electrically separated contact elements with the one of the plurality of field terminals.

Also, the motor may include a switch having a switch terminal, and at least one of the plurality of electrically separated contact elements may have a first contact and a second contact. Preferably, the act of supporting the motor includes supporting the switch on the motor housing, and the act of electrically connecting the plurality of electrically separated contact elements to the motor preferably includes electrically connecting the switch terminal to the second contact of the at least one of the plurality of electrically separated contact elements. The act of supporting the switch may occur substantially simultaneously with the act of electrically connecting the switch terminal to the second contact of the at least one of the plurality of electrically separated contact elements.

The motor may further include a braking circuit and switch assembly having a braking circuit electrically connected to a switch and a plurality of assembly terminals, and at least another one of the plurality of electrically separated contact elements may have a first contact, a second contact and a third contact. Preferably, the act of supporting the motor includes supporting the braking circuit and switch assembly on the motor housing, and the act of electrically connecting the plurality of electrically separated contact elements to the motor includes electrically connecting one of the plurality of assembly terminals to the second contact of the at least one of the plurality of electrically separated contact elements and electrically connecting another of the plurality of assembly terminals to the third contact of the at least another one of the plurality of electrically separated contact elements.

In addition, the motor may include a brush having a brush terminal, and at least one of the plurality of electrically separated contact elements may have a first contact and a second contact. Preferably, the act of supporting the motor includes supporting the brush on the motor housing, and the act of electrically connecting the plurality of electrically separated contact elements to the motor includes electrically connecting the brush terminal to the second contact of the at least one of the plurality of electrically separated contact elements. Preferably, the act of supporting the brush occurs substantially simultaneously with the act of electrically connecting the brush terminal to the second contact of the at least one of the plurality of electrically separated contact elements.

The invention also provides a power tool comprising a motor housing, an electric motor supportable by the motor housing and electrically connectable with a power source, and an electrical circuit assembly. The electrical circuit assembly is provided by a method comprising the acts of providing a terminal member assembly including a plurality of separable contact elements, mounting the terminal member assembly to the motor housing, separating at least two of the plurality of separable contact elements of the terminal member assembly to provide a corresponding plurality of electrically separated contact elements, and electrically connecting the plurality of electrically separated contact elements to the motor to provide a complete electrical circuit for the motor.

The invention additionally provides an electrical connector assembly for a power tool, the electrical connector assembly provided by a method comprising the acts of providing a terminal member assembly including a plurality of electrically separable contact elements, mounting the terminal member assembly to the motor housing, electrically separating the plurality of electrically separable contact elements of the terminal member assembly to provide at least a first electrically separated contact element and a second electrically separated contact element, and electrically connecting the first electrically separated contact element and the second electrically separated contact element to the motor to provide a complete electrical circuit for the motor.

The invention further provides an assembly for use in manufacturing a power tool, the assembly comprising, a motor housing for supporting the motor of the power tool, and an electrical connector assembly. The electrical connector assembly is provided by a method comprising the acts of providing a terminal member assembly including a plurality of separable contact elements, mounting the terminal member assembly to the motor housing, and separating the terminal member assembly to provide at least a first electrically separated contact element and a second electrically separated contact element, the first electrically separated contact element and the second electrically separated contact element being electrically connectable to the motor to provide a complete electrical circuit for the motor.

The invention also provides a method for assembling a power tool comprising the acts of providing a motor and a terminal member for connecting the motor to a power source, forming a motor housing of a moldable material, the act of forming including molding the terminal member with the moldable material of the motor housing, supporting the motor in the housing, and electrically connecting the terminal member and the motor to provide a complete electrical circuit for the motor.

The invention additionally provides a method for assembling a power tool comprising the acts of providing a first electrical component and a second electrical component, providing a terminal member for electrically connecting the first electrical component to the second electrical component, the terminal member including a plurality of separable contact elements, forming a power tool housing of a moldable material, the act of forming including molding the terminal member with the moldable material of the housing, separating the terminal member to provide a corresponding plurality of electrically separated contact elements, supporting the first electrical component and the second electrical component on the housing, and electrically connecting the plurality of electrically separated contact elements to the first electrical component and to the second electrical component to provide a complete portion of the electrical circuit for the power tool.

One advantage of the present invention is that, with the method for assembling and ala the electrical connector assembly of the present invention, assembly of a power tool is less time consuming and less labor-intensive. The motor components are more easily electrically connected to one another with the terminal member assembly, reducing the cost and the complexity of the method and machinery required to assemble a power tool.

Another advantage of the present invention is that, because, in some constructions, the plurality separable contact elements is mounted to the housing as a unitary terminal member assembly, the plurality of electrically separated contact elements is more accurately positioned and supported in the housing, also reducing the cost and complexity of the method and the machinery required to assemble a power tool.

A further advantage of the present invention is that, when the terminal member assembly is molded with the housing, the housing does not have to be specially designed to fixably support and retain the terminal member assembly in the required position.

Yet another advantage of the present invention is that, when the terminal member assembly is molded with the housing, the terminal member assembly and the plurality of electrically separated contact elements provide additional rigidity and strength to the housing. As a result, less material or less durable material may be used to form the housing while maintaining the strength of the housing.

Another advantage of the present invention is that, in some constructions, the terminal member assembly can accommodate different motor components so that the power tool can be configured to provide different operating conditions. For example, in some constructions, the power tool with such a terminal member assembly can alternately include an on/off switch assembly or a braking circuit and on/off switch assembly without requiring a change to the terminal member assembly.

Other features and advantages of the invention will become apparent to those skilled in the art upon review of the following detailed description, claims and drawings.

DESCRIPTION OF THE DRAWINGS

FIG. 2 is a perspective exploded view of a portion of a power tool for use with the terminal member assembly shown in FIG. 1.

FIG. 3A is a perspective view of another portion of the power tool shown in FIG. 2 for use with the terminal member assembly shown in FIG. 1.

FIG. 4 is a rear view of the terminal member assembly shown in FIG. 1.

FIG. 5 is a rear view of the motor housing and the cover shown in FIG. 2 with the terminal member assembly shown mounted to the motor housing.

FIG. 6 is a cross-sectional view taken generally along line 6—6 in FIG. 5.

FIG. 7A is a perspective view of an alternate construction for the portion of the power tool shown in FIG. 3A.

FIG. 7B is a schematic diagram of the electrical circuit for the power tool having the alternate construction illustrated in FIGS. 2 and 7A.

Figure 3B:
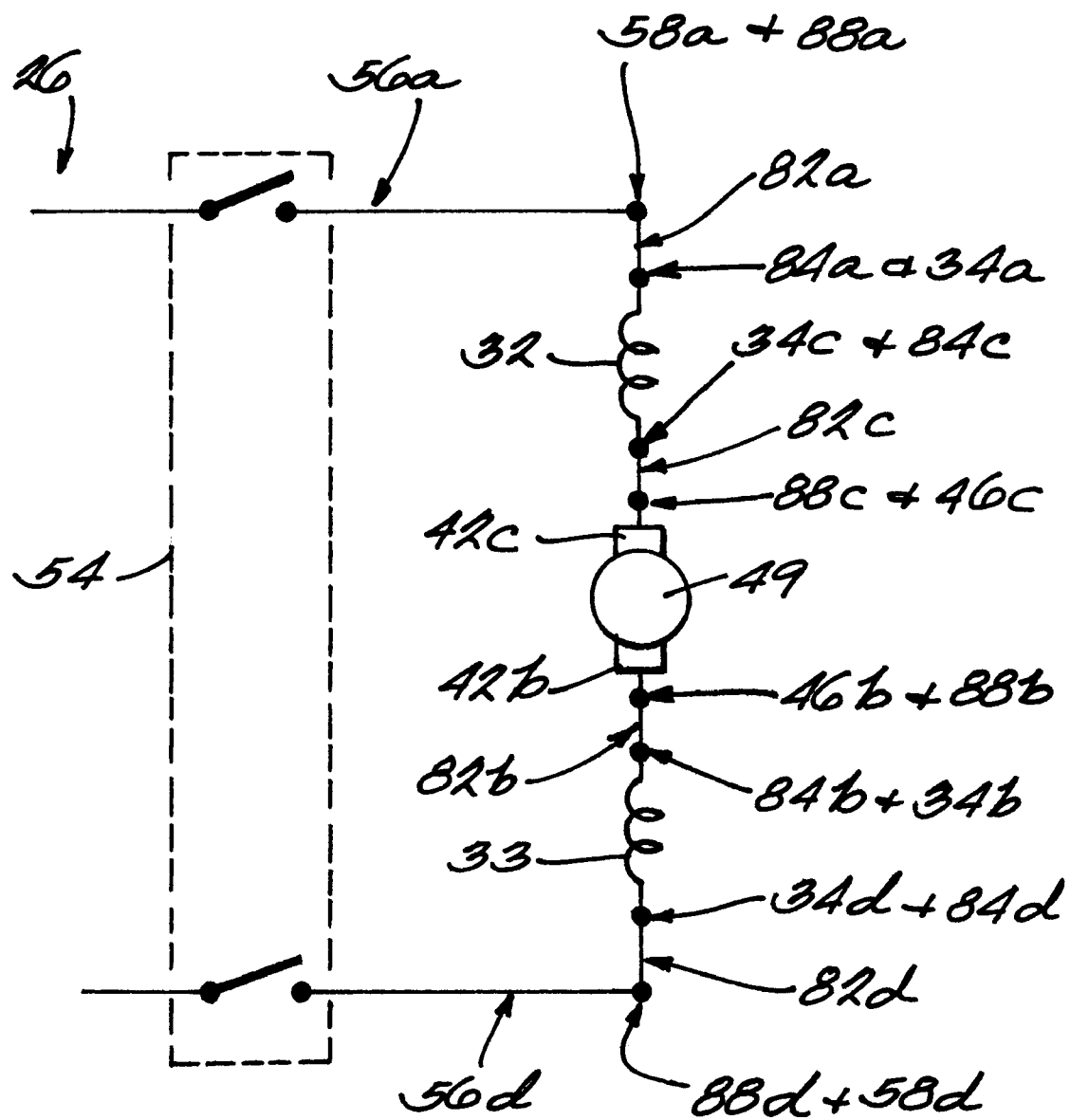
FIG. 3B is a schematic diagram of the electrical circuit for the power tool having the construction illustrated in FIGS. 2 and 3A.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

A terminal member assembly 10 embodying the invention and for use in a power tool 14 is illustrated in the Figures. In the illustrated construction (see FIGS. 2 and 3A), the power tool 14 is a circular saw (partially shown). It should be understood that, in other constructions (not shown), the power tool may be any type of electric power tool, such as a grinder, a drill or another type of saw.

The power tool 14 includes (see FIGS. 2, 3A and 5) a motor housing 18 and an operator's handle 20, which may be formed with or separately from the housing 18 (as shown in FIG. 3A). The housing 18 is formed of a non-conductive, moldable material and has an open forward end and a generally closed rearward end. A bearing member 22 is formed in the closed end of the housing 18. As best shown in FIG. 5, a pair of circumferentially-spaced apart openings 23 are formed adjacent the bearing member 22, and a pair of axially-extending slots 24 are defined adjacent each opening 23. The purpose for the bearing member 22, the openings 23 and the slots 24 is explained below in more detail.

The power tool 14 also includes (see FIGS. 2, 3A and 3B) an electric motor 26 which is connectable to a power source (not shown) by an electrical circuit and operable to drive a tool element, such as a saw blade (not shown), to work on a workpiece (not shown). For purposes of illustration, components of the motor 26 which are electrically connectable to one another are identified by the same italicized letter (a, b, c or d).

In the illustrated construction (see FIGS. 2 and 3B), the motor 26 includes a field assembly 30 having one or more field windings 32 and 33. The field assembly 30 includes a plurality of field terminals 34a–d for electrically connecting the field windings 32 and 33 in the electrical circuit for the motor 26.

In the illustrated construction, the motor 26 also includes a pair of carbon brush assemblies 38b and 38c. Each brush assembly 38 includes a brush housing 40 having a pair of projections 41 formed thereon and slidably housing a carbon brush 42. A female brush terminal 46 and a male brush terminal 48 are electrically connected to each brush 42 and selectively electrically connect each brush assembly 38 in the electrical circuit for the motor 26.

Each brush 42 is electrically engageable, through the corresponding opening 23 in the housing 18, with a commutator 49 (schematically illustrated in FIG. 3B) supported on a rotatable armature (not shown). The armature is rotatably supported by the housing 18, with one end of the armature being supported by the bearing member 22 and the other end being connected to or forming a drive shaft (not shown) for supporting the tool element.

In one illustrated construction, the motor 26 also includes (see FIGS. 3A and 3B) an on/off switch assembly 50 operable to electrically connect the motor 26 to the power source. The switch assembly 50 includes a two-pole on/off switch 54 connected by switch leads 56a and 56d to switch terminals 58a and 58d. The switch terminals 58a and 58d are electrically connectable to the electrical circuit for the motor 26. A trigger member 62 is supported on the handle 20 and is engageable by an operator to operate the on/off switch 54.

Figure 1B:
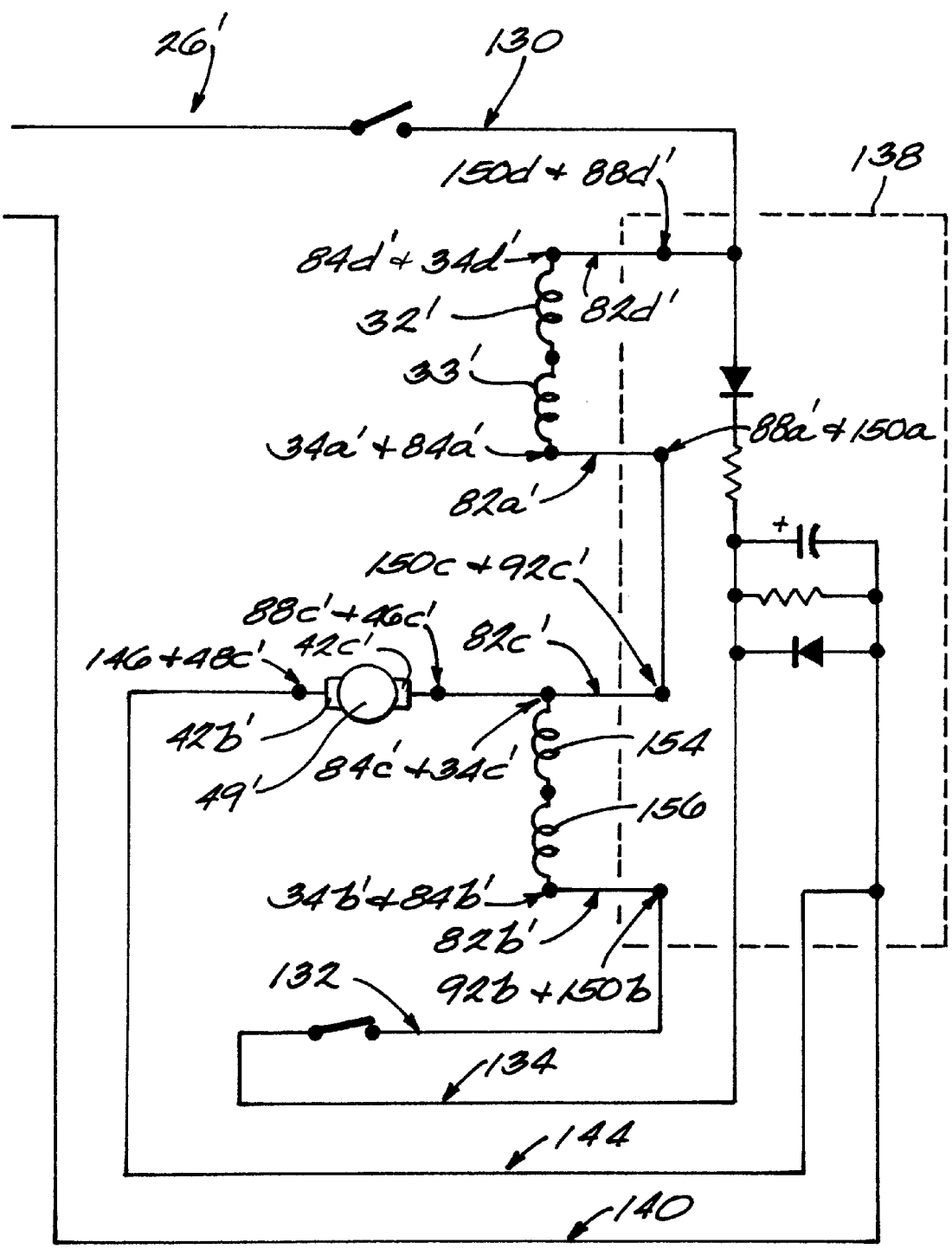
FIG. 1 is a perspective view of a terminal member assembly embodying the invention.

As shown in FIGS. 1 and 4, the terminal member assembly 10 provides a one-piece trace or spider terminal for connecting the components of the motor 26 in a complete electrical circuit. The terminal member assembly 10 is formed of a conductive material, preferably by stamping and folding.

The terminal member assembly 10 includes a plurality of separable contact elements 78. The number of separable contact elements 78 corresponds to the number and type of components of the motor 26 which are to be connected in the complete electrical circuit for the motor 26. In the illustrated construction, the terminal member assembly 10 includes four separable contact elements 78a–d.

During assembly of the power tool 14, as discussed below in more detail, the separable contact elements 78a–d are separated (see FIGS. 1 and 4) to form a corresponding number of electrically separated contact elements 82 (as shown in FIG. 5 and as schematically illustrated in FIG. 3B). In the illustrated construction (see FIGS. 3B and 5), the terminal member assembly 10 is separated into four electrically separated contact elements 82a–d to connect the field assembly 30, the brush assemblies 38a and 38b, and the switch assembly 50 in the complete electrical circuit for the motor 26. In the illustrated construction, each of the electrically separated contact elements 82a–d has a first contact 84 and a second contact 88. Also, in the illustrated construction, electrically separated contact elements 82b and 82c have a third contact 92b and 92c, respectively.

As shown in FIG. 5, the terminal member assembly 10 is mounted to the housing 18. In the preferred embodiment, the terminal member assembly 10 is molded as a unit with the moldable material of the housing 18 when the housing 18 is formed.

In other constructions (not shown), the housing 18 may include connector assemblies (not shown) for fixably mounting the separable contact elements 78a–d to the housing 18. In such constructions, each connector assembly securely fixes the terminal member assembly 10 to the housing 18 before, during and after separation of the separable contact elements 78a–d to provide the electrically separated contact elements 82a–d.

It should be understood that, while in the illustrated construction, the electrically separated contact elements 82a–d are mounted to the housing 18 as a unit, in some aspects of the invention, the electrically separated contact elements 82a–d may be molded into the housing 18 separately, rather than as a unit.

Once the terminal member assembly 10 is mounted to the housing 18, the separable contact elements 78a–d are separated to provide the electrically separated contact element 82a–d. In the illustrated construction (see FIG. 5), points of electrical separation or openings 94, 96, 98 and 100 are created between adjacent ones of the separable contact elements 78a–d to provide the electrically separated contact elements 82a–d. Preferably, the openings 94–100 are formed by punching the terminal member assembly 10 and the housing 18, and, during punching, corresponding holes 102, 104, 106 and 108 are formed in the housing 18 and are substantially aligned with the openings 94, 96, 98 and 100, respectively.

In other constructions (not shown), the terminal member assembly 10 may be formed of electrically separated contact elements (not shown but similar to electrically separated contact elements 82a–d) which are physically connected to one another while their electrical separation is maintained. In such constructions, a non-conducting material physically connects each electrically separated contact element to maintain the terminal member assembly 10 as a unit before, during and after mounting of the terminal member assembly 10 to the housing 18. As a result, in such constructions, punching of the terminal member assembly 10 and the housing 18 is not required to provide the electrically separated contact elements.

In the illustrated construction (see FIG. 5), the electrical connector assembly also includes a plurality of non-conducting elements 112, 114, 116 and 118 to be positioned between adjacent ones of the electrically separated contact elements 82a–d. Preferably, the non-conducting elements 112, 114, 116 and 118 are positioned in the openings 94, 96, 98 and 100, respectively, through the holes 102, 104, 106 and 108, respectively. The non-conducting elements 112–118 fill the openings 94–100, confirm that the openings 94–100 were created or punched, and provide a seal to prevent debris, such as pieces of material from the workpiece or other contaminants, from entering the openings 94–100 and effecting the electrical circuit of the motor 26.

In the illustrated construction, the power tool 14 also includes (see FIGS. 2, 5 and 6) a support member, such as a separate motor housing cover 122, on which the non-conducting elements 112–118 are supported. In the illustrated construction, the non-conducting elements 112–118 are formed with the cover 122. When the cover 122 is positioned over the housing 18, the non-conducting elements 112–118 are positioned through the holes 102–108, respectively, and into the openings 94–100, respectively.

In other constructions (not shown), the support member supporting the non-conducting elements 112–118 may not be a cover (such as the cover 122) but may be a support member supportable on the closed rearward end of the housing 18 to support the non-conducting elements 112–118 in their respective positions described above.

To assemble the power tool, the terminal member assembly 10 is mounted in the housing 18 and, preferably, is molded with the material of the housing 18 (as shown in FIG. 5) during molding of the housing 18. The separable contact elements 78a–d are then electrically separated from one another to provide the corresponding number of electrically separated contact elements 82a–d. To electrically separate the separable contact elements 78a–d, the openings 94, 96, 98 and 100 are created between adjacent ones of the separable contact elements 78a–d, preferably by punching the terminal member assembly 10 and the housing 18.

Once the separable contact elements 78a–d are separated to provide the electrically separated contact elements 82a–d, the components of the motor 26 are connected to the electrically separated contact elements 82a–d to provide a complete electrical circuit for the motor 26, as schematically illustrated in FIG. 3B. The field assembly 30 (see FIG. 2) is inserted into the open forward end of the housing 18 and supported in the housing 18. As the field assembly 30 is inserted, the field terminals 34a–d engage the first contacts 84a–d, respectively, of the electrically separated contact elements 82a–d, respectively, as schematically illustrated in FIG. 3B.

The brush assemblies 38b and 38c (see FIG. 2) are supported on the housing 18 with the projections 41 engaging the slots 24 to fix each brush assembly 38 to the housing 18. As the brush assemblies 38b and 38c are supported on the housing 18, the female brush terminals 46b and 46c engage the second contacts 88b and 88c, respectively, of the electrically separated contact elements 82*b* and 82*c*, respectively, as schematically illustrated in FIG. 3B. Each brush 42*b* and 42*c* can extend through the corresponding opening 23 to electrically engage the commutator 49 once the commutator 49 is supported in the housing 18.

In one illustrated construction (partially shown in FIG. 3A), the switch assembly 50 is supported on the housing 18 in the handle 20. The switch terminals 58*a* and 58*d* are electrically connected to the second contacts 88*a* and 88*d*, respectively, of the electrically separated contact elements 82a and 82d, respectively, as shown in FIG. 3A and as schematically illustrated in FIG. 3B.

Once the components of the motor 26 are electrically connected to the electrically separated contact elements 82*a–d*, as described above, a complete electrical circuit for the motor 26 is provided (as schematically illustrated in FIG. 3B).

As shown in FIGS. 2 and 5, the cover 122 is positioned over the housing 18. As the cover 122 is positioned (see FIG. 5), the non-conducting elements 112–118 are positioned through the holes 102–108, respectively, and into the openings 94–100, respectively. The remaining components (not shown) of the power tool 14 are then assembled to provide a fully-assembled power tool 14.

An alternate illustrated construction for the motor 26' of a power tool 14' is shown in FIG. 7A and schematically illustrated in 7B. Common elements are identified by the same reference numbers "'".

In this alternate illustrated construction, the motor 26' includes a braking circuit and on/off switch assembly 126 which may be substituted for the switch assembly 50, described above, during assembly of the power tool 14'. The assembly 126 includes a two-pole on/off switch 54' connected to leads 130, 132 and 134. A trigger (not shown but similar to the trigger 62) is operatively connected to the switch 54'.

The assembly 126 also includes a braking circuit 138 (schematically illustrated in FIGS. 7A and 7B). The braking circuit 138 is a regenerative dynamic braking circuit and is similar to that illustrated in U.S. Pat. No. 5,294,874, which is herein incorporated by reference. The leads 130, 132 and 134 electrically connect the switch 54' to the braking circuit 138. A power supply lead 140 and a brush lead 144 having a female terminal 146 are also electrically connected to the braking circuit 138. Assembly terminals 150*a–d* are formed on the assembly 126 and are for connecting the assembly 126 to the electrical circuit of the motor 26'.

To assemble the power tool 14' having the alternate illustrated construction (partially shown in FIG. 7A and schematically illustrated in FIG. 7B), the assembly 126 is supported on the housing (not shown but similar to the housing 18). As schematically illustrated in FIG. 7B, the assembly terminals 150*a* and 150*d* are connected to the second contacts 88*a'* and 88*d'*, respectively, of the electrically separated contact elements 82*a'* and 82*d'*, respectively, and the assembly terminals 150*b* and 150*c* are electrically connected to the third contacts 92*b'* and 92*c'*, respectively, of the electrically separated contact elements 82*b'* and 82*c'*, respectively.

The terminal 146 is electrically connected to the male terminal 48*b'* of the brush assembly 38*b'*. In this alternate construction, the second contact (not shown but similar to the second contact 88*b*) of the electrically separated contact element 82*b'* is prevented from electrically connecting to the female terminal (not shown but similar to the terminal 46*b*) of the brush assembly 38*b'*. In some constructions, this second contact may simply be broken off from the electrically separated contact element 82*b'* during assembly of the power tool 14'. In other constructions (not shown), the terminal member assembly 10' may be formed so that the electrically separated contact element 82*b'* does not include a second contact.

In this alternate illustrated construction, the field assembly 30' includes (see FIG. 7B) field windings 32' and 33' and brake windings 154 and 156. Field terminals 34*a'–d'* electrically connect the field windings 32' and 33' and the brake windings 154 and 156 to the electrical circuit for the motor 26' in a manner similar to that described above for the field assembly 30. The brush assembly 38*c'* is supported and electrically connected as described above, with the terminal 48*c'* being electrically connected to the second contact 88*c'* of the electrically separated contact element 82*c'*.

Once the components of the motor 26' are electrically connected to the electrically separated contact elements 82*a'–d'*, as described above, a complete electrical circuit for the motor 26' is provided (as schematically illustrated in FIG. 7B).

It should be understood that, while in the illustrated constructions, the motor 26 includes a field assembly 30, a pair of brush assemblies 38*b* and 38*c* and a switch assembly 50 (or a braking circuit and on/off switch assembly 126), in other constructions (not shown), the motor 26 may include other or different components to be electrically connected by the electrically separated contact elements 82*a–d* of the terminal member assembly 10. It should also be understood that, in some aspects of the invention, the terminal member assembly 10 may be mounted to the housing 18 and separated to provide the electrically separated contact elements 82*a–d* for electrically connecting a first electrical component and a second electrical component of a power tool, other than the components of the motor 26, described above.

It should be understood that, while in the illustrated construction, the terminal member assembly 10 is separated to provide four electrically separated contact elements 82*a–d*, in other constructions (not shown), the terminal member assembly may be separated to provide less than four or more than four electrically separated contact elements, as required to electrically connect the components of a power tool.

With the present invention, assembly of the power tool 14 is less time consuming and less labor-intensive, reducing the cost and the complexity of assembly of the power tool 14. Also, with the present invention, the electrically separated contact elements 82*a–d* are more accurately positioned and supported in the housing 18. Further, with the present invention, when the terminal member assembly 10 is molded with the housing 18, the electrically separated contact elements 82*a–d* provide additional rigidity and strength to the housing 18.

Various features of the invention are set forth in the following claims.

We claim:

1. A power tool provided by a method comprising the acts of:

providing a motor housing;

providing an electric motor supportable by said motor housing and electrically connectable with a power source; and providing an electrical circuit assembly provided by a method including the acts of providing a terminal member assembly including a plurality of electrically separable contact elements, mounting said terminal member assembly to said housing, creating an opening between adjacent ones of said plurality of electrically separable contact elements to provide a corresponding plurality of electrically separated contact elements, and electrically connecting said plurality of electrically separated contact elements to said motor to provide a complete electrical circuit for said motor; and positioning a non-conducting element in said opening between adjacent ones of said plurality of electrically separated contact elements.

2. The power tool provided by the method of claim 1, wherein said act of positioning a non-conducting element includes providing a separate cover having said non-conducting element mounted thereon, positioning said cover over said motor housing, and positioning said non-conducting element in said opening between adjacent ones of said plurality of electrically separated contact elements.

3. The power tool provided by the method of claim 1, wherein said act of creating an opening includes punching an opening in said terminal member assembly between adjacent ones of said plurality of electrically separable contact elements to provide said plurality of electrically separated contact elements and a corresponding hole in said motor housing, said hole being substantially aligned with said opening, and wherein said act of positioning a non-conducting element includes positioning said non-conducting element in said opening through said hole.

4. The power tool provided by the method of claim 3, wherein said act of positioning said non-conducting element includes providing a seal between said adjacent ones of said plurality of electrically separated contact elements.

5. The power tool provided by the method of claim 1, wherein said act of creating an opening between adjacent ones of said plurality of electrically separated contact elements includes providing a first electrically separated contact element, a second electrically separated contact element, a third electrically separated contact element, and a fourth electrically separated contact element, said power tool being provided by the method further comprising the acts of:

providing a member supporting a first non-conducting element, a second non-conducting element, and a third non-conducting element;

supporting said member on said motor housing;

positioning said first non-conducting element between said first electrically separated contact element and said second electrically separated contact element;

positioning said second non-conducting element between said second electrically separated contact element and said third electrically separated contact element; and positioning said third non-conducting element between third electrically separated contact element and said fourth electrically separated contact element.

6. The power tool provided by the method of claim 5, wherein said act of providing a member includes supporting a fourth non-conducting element, said power tool provided by the method further comprising the act of positioning said fourth non-conducting element between said first electrically separated contact element and said fourth electrically separated contact element.

7. An electrical connector assembly for a power tool, the power tool including a motor housing, and an electric motor supportable by the motor housing, said electrical connector assembly provided by a method comprising the acts of:

providing a terminal member assembly including a plurality of electrically separable contact elements;

mounting said terminal member assembly to the housing;

creating an opening between adjacent ones of said plurality of electrically separable contact elements to provide at least a first electrically separated contact element and a second electrically separated contact element;

positioning a non-conducting element between said first electrically separated contact element and said second electrically separated contact element; and electrically connecting said first electrically separated contact element and said second electrically separated contact element to the motor to provide a complete electrical circuit for the motor.

8. The electrical connector assembly provided by the method of claim 7, wherein said act of creating an opening between adjacent ones of said plurality of electrically separable contact elements includes providing a third electrically separated contact element and a fourth electrically separated contact element, and wherein said act of positioning a non-conducting element includes positioning a first non-conducting element between said first electrically separated contact element and said electrically second separated contact element, positioning a second non-conducting element between said second electrically separated contact element and said third electrically separated contact element, and positioning a third non-conducting element between said third electrically separated contact element and said fourth electrically separated contact element.

9. A power tool provided by a method comprising the acts of:

providing a motor housing;

providing an electric motor supportable by said housing and electrically connectable with a power source, said electrical motor including a field, a brush, and a switch; and providing an electrical circuit assembly provided by a method including the acts of providing a terminal member assembly including a plurality of electrically separable contact elements, mounting said terminal member assembly to said housing, and separating said plurality of electrically separable contact elements of said terminal member assembly to provide at least a first electrically separated contact element and a second electrically separated contact element; and electrically connecting said first electrically separated contact element between said field and said switch and said second electrically separated contact element between said field and said brush to provide a complete electrical circuit for said motor.

10. The power tool provided by the method of claim 9, wherein said housing is formed of a molded material, and wherein said act of mounting said terminal member assembly includes molding said terminal member assembly into said housing.

11. The power tool provided by the method of claim 9, further comprising the act of supporting said field in said housing simultaneously with said electrically connecting act.

12. The power tool provided by the method of claim 9, wherein the first electrically separated contact element has a first contact, wherein the field has a plurality of field terminals, and wherein said electrically connecting act includes connecting the first contact of the first electrically separated contact element with one of the plurality of field terminals on the field.

13. The power tool provided by the method of claim 9, wherein the first electrically separated contact element has a first contact, wherein the switch has a switch terminal, and wherein said electrically connecting act includes connecting the first contact of the first electrically separated contact element with the switch terminal on said switch.

14. The power tool provided by the method of claim 9, further comprising the act of providing a switch assembly having a braking circuit electrically connected to said switch and a plurality of assembly terminals, wherein said electrically connecting act includes connecting one of said plurality of assembly terminals to a second contact of said first electrically separated contact elements and electrically connecting another of said plurality of assembly terminals to a third contact of said second electrically separated contact elements.

15. The power tool provided by the method of claim 9, wherein said electrically connecting act includes connecting a first contact of said second electrically separated contact element with a brush terminal of said brush simultaneously with supporting said brush on said motor housing.

16. The power tool provided by the method of claim 9, wherein said act of separating said terminal member assembly includes creating an opening between adjacent ones of said plurality of electrically separable contact elements to provide said first electrically separated contact element and said second electrically separated contact element.

17. The power tool provided by the method of claim 16, further comprising the act of positioning a non-conducting element in said opening between said first electrically separated contact element and said second electrically separated contact element.

18. The power tool provided by the method of claim 16, further comprising the acts of:
providing a separate cover having a non-conducting element mounted thereon;
positioning said separate cover over said motor housing; and
positioning said non-conducting element in said opening between said first electrically separated contact element and said second electrically separated contact element.

19. The power tool provided by the method of claim 16, wherein said act of creating an opening includes punching an opening in said terminal member assembly between adjacent ones of said plurality of separable electrically contact elements to provide said first electrically separated contact element and said second electrically separated contact element.

20. The power tool provided by the method of claim 19, wherein said act of punching includes providing a corresponding hole in said housing, said hole being substantially aligned with said opening.

21. The power tool provided by the method of claim 20, further comprising the acts of positioning a non-conducting element in said hole and in said opening between said first electrically separated contact element and said second electrically separated contact element.

22. The power tool provided by the method of claim 21, wherein said act of positioning said non-conducting element includes providing a seal between said first electrically separated contact element and said second electrically separated contact element.

23. The power tool provided by the method of claim 9, wherein said act of separating said terminal member includes providing a first electrically separated contact element, a second electrically separated contact element, a third electrically separated contact element, and a fourth electrically separated contact element, wherein said method further comprises the acts of:
providing a member supporting a first non-conducting element, a second non-conducting element, and a third non-conducting element;
supporting said member on said motor housing;
positioning said first non-conducting element between said first electrically separated contact element and said second electrically separated contact element;
positioning said second non-conducting element between said second electrically separated contact element and said third electrically separated contact element; and
positioning said third non-conducting element between third electrically separated contact element and said fourth electrically separated contact element.

24. The power tool provided by the method of claim 23, wherein said act of providing a member includes supporting a fourth non-conducting element, wherein said method further comprises the act of positioning said fourth non-conducting element between said first electrically separated contact element and said fourth electrically separated contact element.

25. A power tool provided by the method comprising the acts of:
providing a terminal member assembly including a plurality of electrically separable contact elements;
providing an electric motor electrically connectable with a power source;
molding said terminal member assembly within a motor housing, said housing being formed of a moldable material;
separating at least two of said plurality of electrically separable contact elements of said terminal member assembly to provide a corresponding plurality of electrically separated contact elements;
electrically connecting said plurality of electrically separated contact elements to said motor to provide a complete electrical circuit for said motor; and
supporting an electric motor by said housing.

26. The power tool provided by the method of claim 25, wherein said act of separating said terminal member assembly includes punching an opening in said terminal member assembly between adjacent ones of said plurality of separable electrically contact elements to provide said plurality of electrically separated contact elements.

27. The power tool provided by the method of claim 26, wherein said act of separating said terminal member assembly includes punching a corresponding hole in said housing, said hole being substantially aligned with said opening.

28. The power tool provided by the method of claim 27, further comprising the act of positioning a non-conducting element through said hole and into said opening.

* * * * *